US009519459B2

(12) United States Patent
Kim et al.

(10) Patent No.: US 9,519,459 B2
(45) Date of Patent: Dec. 13, 2016

(54) HIGH EFFICIENCY COMPUTER FLOATING POINT MULTIPLIER UNIT

(71) Applicant: Wisconsin Alumni Research Foundation, Madison, WI (US)

(72) Inventors: Nam Sung Kim, Middleton, WI (US); Syed Gilani, Madison, WI (US); Michael Schulte, Austin, TX (US)

(73) Assignee: Wisconsin Alumni Research Foundation, Madison, WI (US)

( * ) Notice: Subject to any disclaimer, the term of this patent is extended or adjusted under 35 U.S.C. 154(b) by 252 days.

(21) Appl. No.: 14/310,868

(22) Filed: Jun. 20, 2014

(65) Prior Publication Data

US 2015/0370537 A1 Dec. 24, 2015

(51) Int. Cl.
*G06F 7/487* (2006.01)

(52) U.S. Cl.
CPC .................. *G06F 7/4876* (2013.01)

(58) Field of Classification Search
CPC .................................................. G06F 7/4876
See application file for complete search history.

(56) References Cited

U.S. PATENT DOCUMENTS 5,262,973 A * 11/1993 Richardson ............. G06F 7/535
708/525
5,600,569 A * 2/1997 Nishiyama ................ G06F 7/52
708/625
6,233,595 B1 * 5/2001 Cheng ................... G06F 7/4876
708/503
2014/0143564 A1 * 5/2014 Tannenbaum ........ G06F 7/4876
713/320

OTHER PUBLICATIONS

Schulte et al.; Truncated Multiplication with Correction Constant; IEEE Xplore Document; VLSI signal Processing, VI, 1993: pp. 388-396; Austin Texas.
Kulkarni et al.: Trading Accuracy for Power with an Underdesigned Multiplier Architecture VLSI Design, 2011 24th International Conference (date of conference Jan. 2-7, 2011); pp. 346-351: Los Angeles, California.
Fang et al.; Lightweight Floating-Point Arithmetic: Case Study of Inverse Discrete Cosine Transform; Journal; EURASIP Journal on Applied Signal Processing vol. 2002 Issue 1, 2002; pp. 879-892 Hindawi Publishing Corp. New York, NY.

* cited by examiner

*Primary Examiner* — Chuong D Ngo
(74) *Attorney, Agent, or Firm* — Boyle Fredrickson, S.C.

(57) ABSTRACT

A high-power-efficiency multiplier combines a standard floating-point multiplier with a power-of-two multiplier that performs multiplications by shifting operations without the need for floating-point multiplication circuitry. By selectively steering some operands to this power-of-two multiplier, substantial power savings may be realized. In one embodiment, multiplicands may be modified to work with the power-of-two multiplier introducing low errors that may be accommodated in pixel calculations.

18 Claims, 2 Drawing Sheets

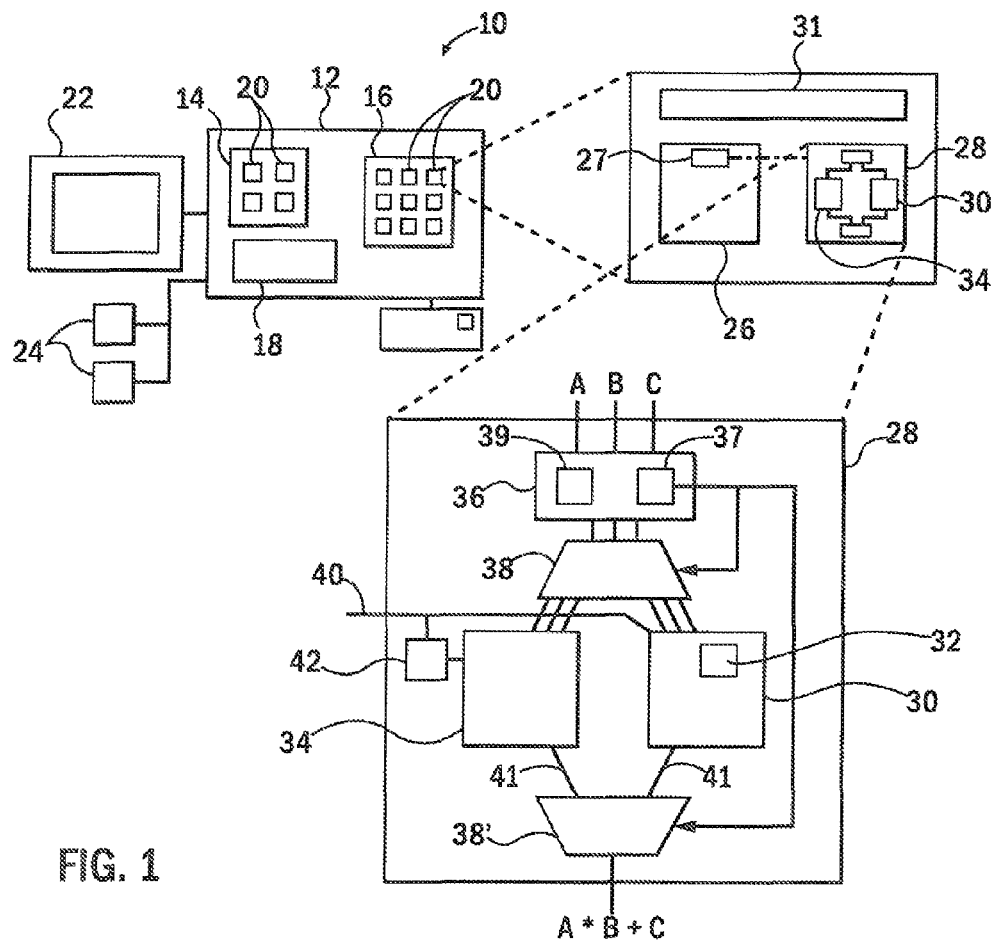
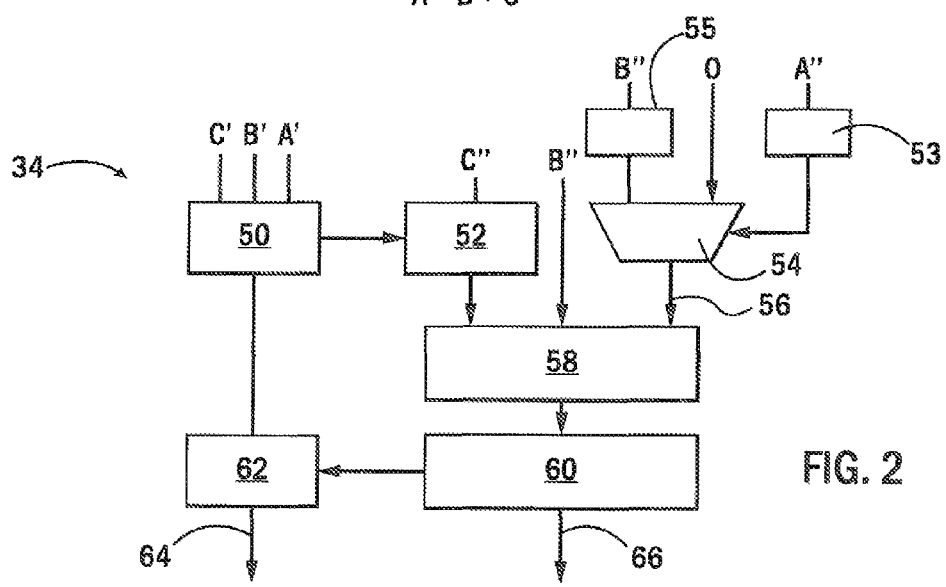
FIG. 1
FIG. 2

HIGH EFFICIENCY COMPUTER FLOATING POINT MULTIPLIER UNIT

STATEMENT REGARDING FEDERALLY SPONSORED RESEARCH OR DEVELOPMENT

This invention was made with government support under 0953603 awarded by the National Science Foundation. The government has certain rights in the invention

CROSS REFERENCE TO RELATED APPLICATION

--

BACKGROUND OF THE INVENTION

The present invention relates to circuits for multiplying numbers in an electronic computer and in particular to a circuit for providing high-efficiency floating-point multiplication.

Electronic computers often represent numbers in a floating-point format. The floating-point format supports a larger range of numbers than can be provided for integer representations and conveniently permits the expression of fractional values, both of these benefits being obtained at the loss of some precision.

Generally, the floating-point format separately provides a sign bit (positive or negative), exponent bits (defining a base 2 exponent) and significand or mantissa bits. The general representation of a floating-point number will therefore be in the form:

$$(-1)^{sign} * significand * 2^{exponent} \tag{1}$$

A common standard for floating-point representation is provided by IEEE standard 754 hereby incorporated by reference. The common single precision floating-point format under this standard employs 32 bits and, proceeding from left (MSB) to right (LSB), allotting a single bit to the sign, eight bits to the exponent, and 23 bits to the significand, the latter of which includes an implicit left most significant bit 24 which is always one for a large class of floating-point numbers, known as normalized floating-point numbers. The normalization (left justification) of the significand in these numbers removes all the leading zeros from the significand. The leading one thus need not be stored. Floating-point numbers whose left most significand bit 24 is not one are known as subnormals. Subnormals are encountered infrequently in applications, and are particularly rare in pixel processing applications.

High-performance computer architectures provide specialized circuitry for processing floating-point calculations, for example, in the form of a floating-point fused multiply-add (FMA) unit which performs the general calculation of:

$$A*B+C \tag{2}$$

Such circuits normally provide separate processing paths for the exponent and significand data. The exponent processing path requires simple logic blocks like small adders and comparators. The significand processing path requires complex logic that can have considerably longer processing time and consumes more power. For example, multiplication of the significands can be implemented using complex but high-speed significand multiplier circuit providing multiple stages of shifters and accumulators or architectures such as Wallace trees or Dadda multipliers.

An important task of many modern processors, and in particular portable devices such as cell phones and tablets, is processing of images comprised of pixel data. Pixel data is typically composed of one or more color channels, such as reg, green blue and alpha. The data values for each of these channels are relatively constrained, for example, having only positive values from 0 to 255 for an 8-bit per channel image format. Pixel data appears to be of the type that might be readily handled by integer arithmetic, but the need for sophisticated image processing normally requires floating-point operations, for example, for the application of filters and blending algorithms which apply non-integer weights. Such floating-point operations often must be repeated for millions of pixels.

The energy consumed by floating-point processors in common image-centric applications for portable devices such as cell phones and tablets can significantly affect the amount of time that the device can operate between battery chargings.

SUMMARY OF THE INVENTION

The present inventors have determined that arithmetic operations can account for 30 percent of the overall energy consumption of such applications and that the significand multiplier of a floating-point multiplier circuit can consume as much a 67 percent of the multiplier energy.

The present invention provides a floating-point multiplier system that provides two alternative multipliers, one providing standard floating-point multiplication and the other limited to multiplying numbers where one multiplicand is a perfect power-of-two (i.e. $2^N$ such as 2, 4, 8 . . . ) or sum of two numbers that are each perfect powers-of-two (e.g. $2^N+2^{N+1}$ such as 3, 6, 12 . . . ). Products having one multiplicand of this type can be calculated by simple shifting of the significand eliminating the standard significand multiplier for a substantial power savings and speed advantage. Selector circuitry steers mulitplicands to this "power-of-two" multiplier opportunistically.

In one embodiment, the range of multiplicands that can be handled by the power-of-two multiplier is substantially increased by approximating some multiplicands with a number that is a perfect power-of-two or a sum of two numbers that are each perfect powers-of-two. This approximation is practical for many imaging applications where minor approximation errors are beneath the perception limits of a human observer or otherwise acceptable.

More specifically, the invention provides a multiplier circuit system for an electronic computer including two multipliers: a floating-point multiplier circuit receiving floating-point multiplicands and outputting a floating-point product of the floating-point multiplicands, and a power-of-two multiplier circuit receiving constrained floating-point multiplicands and outputting a floating-point product of the constrained floating-point multiplicands when the constrained floating-point multiplicands include at least one multiplicand limited to a number equal to an integer power-of-two or a sum of two numbers each equal to an integer power-of-two. A selector circuit directs floating-point multiplicands received by the multiplier circuit system to one of either the floating-point multiplier circuit or the power-of-two multiplier circuit and directs a corresponding one of the floating-point products of the floating-point multiplier circuit and power-of-two multiplier circuit to an output from the multiplier circuit system.

It is thus a feature of at least one embodiment of the invention to provide alternative multipliers that permit a flexible trade-off between versatility and power consumption. The floating-point multiplier provides greater versatility and greater power consumption while the power-of-two multiplier may provide for lower versatility and lower power consumption.

The selector circuit may direct multiplicands to the power-of-two multiplier circuit only when at least one multiplicand is a number equal to an integer power-of-two or a sum of two numbers each equal to an integer power-of-two.

It is thus a feature of at least one embodiment of the invention to identify multiplicands that can be processed with a simple single stage of shifting and addition, and direct them to the power-of-two multiplier for power savings.

The multiplier circuit may include an approximator circuit receiving multiplicands and changing at least one of the received multiplicands to be a number equal to an integer power-of-two or a sum of two numbers each equal to an integer power-of-two.

It is thus a feature of at least one embodiment of the invention to greatly expand the capabilities of the floating-point multiplier to handle numbers that may be approximated, for example, those associated with pixel arithmetic.

The approximator circuit may change the received multiplicand only when the change is below a predetermined magnitude.

It is thus a feature of at least one embodiment of the invention to permit flexible control of the amount of approximation error permitted in the diversion of the multiplicand to the processor.

The approximator circuit may change the received multiplicands to upwardly or downwardly rounded values by inspection of a subset of the most significant bits of the significand of the multiplicand.

It is thus a feature of at least one embodiment of the invention to provide a simple approximation technique employing basic bit operations easily implemented in hardware.

The floating-point multiplicands may include an exponent portion and a significand portion and the floating-point multiplier may include a significand multiplier and the power-of-two multiplier circuit may not include a significand multiplier.

It is thus a feature of at least one embodiment of the invention to eliminate the need to use a power-hungry significand multiplier for at least some floating-point multiplications.

The power-of-two multiplier circuit may include a significand shifter shifting one multiplicand if the multiplicand is the sum of two numbers equal to powers-of-two.

It is thus a feature of at least one embodiment of the invention to permit the processing not only of powers-of-two but also numbers that are sums of powers-of-two.

The shift may be one position to the right when the multiplicand is the sum of two numbers equal to consecutive powers-of-two.

It is thus a feature of at least one embodiment of the invention provide a rapid system handling numbers that are consecutive powers-of-two.

The floating-point multiplier and power-of-two multiplier may each accept three inputs including two multiplicands and one addend and operates to multiply the two multiplicands and sums the resulting product with the addend.

It is thus a feature of at least one embodiment of the invention to permit replacement of a fused multiply add unit commonly used in processors.

Each of the floating-point and power-of-two multipliers may be synchronous circuits receiving a clock signal and the power-of-two multiplier may receive a slower clock signal than the floating-point multiplier.

It is thus a feature of at least one embodiment of the invention to reduce the power consumption of the power-of-two multiplier even further by reducing its clock speed.

The floating-point multiplier and power-of-two multiplier may provide for multiplications of the multiplications with substantially identical processing time.

It is thus a feature of at least one embodiment of the invention to simplify the integration of these two multipliers together by matching their processing times.

The selector circuit may further reduce power to the floating-point multiplier circuit when the multiplications are directed to the power-of-two multiplier circuit.

It is thus a feature of at least one embodiment of the invention to reduce the idle power consumed by the floating-point processor as well as the power consumed during multiplication.

The multiplication system may be used in a graphic processing unit.

It is thus a feature of at least one embodiment of the invention to greatly reduce the power used in pixel arithmetic where the multiplicand can often be approximated or be equal to powers-of-two or simple sums of powers-of-two.

Invention may be used in an electronic computer having a processor for executing a stored program as powered by a battery.

It is thus a feature of at least one embodiment of the invention to improve the battery life of portable devices particularly those having intensive graphics processing.

These particular objects and advantages may apply to only some embodiments falling within the claims and thus do not define the scope of the invention.

BRIEF DESCRIPTION OF THE FIGURES

FIG. 1 is a set of successively expanded block diagrams showing a general computing device having processor cores each comprised of a processor and a multiplier circuit where the multiplier circuit includes both a standard floating-point multiplier and a power-of-two multiplier according to the present invention;

FIG. 2 is a detailed block diagram of a power-of-two multiplier of FIG. 1;

DETAILED DESCRIPTION OF THE PREFERRED EMBODIMENT

Figure 3:
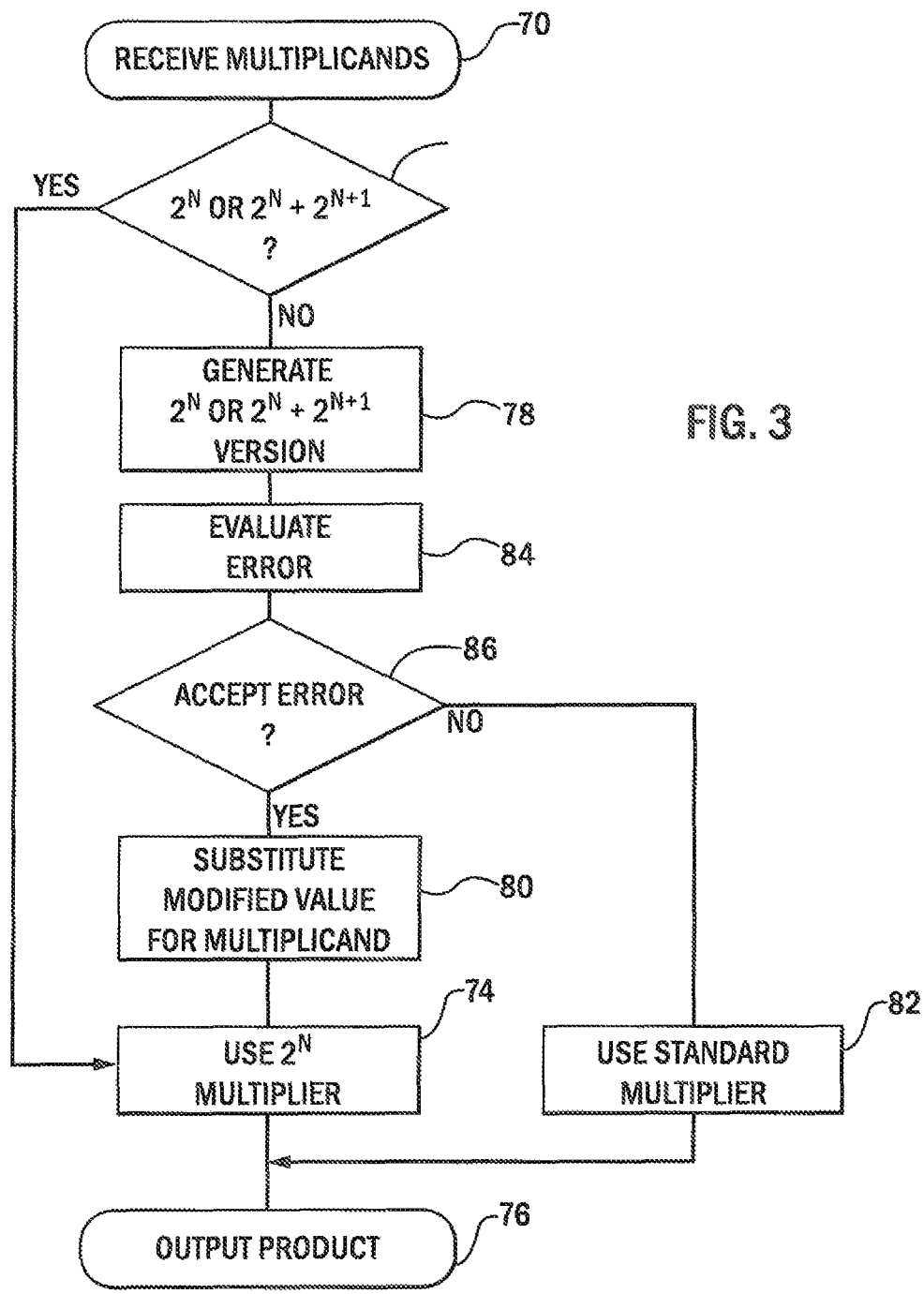
FIG. 3 is a flowchart describing a pre-processor circuit that may be used to distribute a multiplicand to one of either the floating-point multiplier or power-of-two multiplier of FIG. 1 and which may modify the received multiplicand according to a predefined error limit for processing by the power-of-two multiplier.

Referring now to FIG. 1, a portable computational device 10, such as a cell phone or tablet computer, may provide processor platform 12, for example, contained on a circuit card or the like, composed of inter-communicating circuit elements including a processor 14, a graphic processor 16 and associated memory 18.

The processor platform 12 may communicate with interface electronics 22, for example, a touchscreen or the like, allowing for the display of high resolution three-color images and the receipt of touch information from a user as is understood in the art. The processor platform 12 may also communicate with various ancillary circuit components 24, depending on the function of the portable computational device 10, including but not limited to, for example, various wireless transceivers (including cell phone, W-Fi, Bluetooth and the like) and various sensors including but not limited to: a magnetometer, accelerometer, temperature sensor, gyroscope and the like.

The portable computational device 10 may be powered by a battery 19 that may be replaced or recharged. The battery 19 provides electrical power to the above components during a battery life being a time between battery charging or replacement as determined principally by the amount of power consumed by the above described electrical components of the portable computational device 10.

In one embodiment, the processor 14 and graphic processor 16 may each include multiple processor cores 20. These processor cores 20 of the processor 14 and graphic processor 16 differ from each other but each may include a general processor element 26 and communicate with a hardware multiplier circuit 28 as will be described below. The general processor element 26 may include an instruction decoder circuit 27 and may provide multiplicand values to the hardware multiplier circuit 28.

The general processor element 26 and hardware multiplier circuit 28 will typically, but need not, be integrated onto the same substrate. The general processor elements 26 may communicate with other processor cores 20 and with memory 18 through bus interface circuitry 31, of a type generally known in the art, to receive program instructions and to read and write data.

In the present invention, the hardware multiplier circuit 28 provides two different multiplier circuits in parallel. The first is a standard floating-point multiplier circuit 30 of the type understood in the art allowing for the multiplication of floating-point numbers formatted, for example, as described above. Generally the floating-point multiplier circuit 30 will include a significand multiplier 32 capable of multiplying any two single or double precision floating-point significands properly expressed in a floating-point format to provide a product. So, for example, the floating-point multiplier circuit 30 may receive 32-bit single precision floating-point numbers expressed in IEEE standard 754 and having a 23-bit significand.

The second multiplier type will be termed a power-of-two multiplier circuit 34 that may operate in parallel with the standard floating-point multiplier circuit 30 and will be discussed in more detail below. The power-of-two multiplier circuit 34 generally will not be able to multiply any two floating-point numbers, but one floating-point number must be limited to a small subset, for example, represented by a single precision significand having less than 23 bits. Typically the significand of at least one multiplicand for the power-of-two multiplier circuit 34 will be less than half that of the significand that can be accommodated by the floating-point multiplier circuit 30 and, in a preferred embodiment, the significand may be limited to less than three bits and preferably two bits.

Generally, the hardware multiplier circuit 28 and both the standard floating-point multiplier circuit 30 and power-of-two multiplier circuit 34 may implement a fused multiply-add (FMA) unit receiving two multiplicands (A and B) and one addend C to perform the general calculation A*B+C as described above. These values are received at a pre-processing circuit 36 which analyzes them to see if they can be processed by the power-of-two multiplier circuit 34. This determination may include a modification of one of the received multiplicands converting it to a form that allows it to be processed by the power-of-two multiplier circuit 34, this conversion changing the value of the received multiplicand within a predetermined tolerance.

In order to be processed by the power-of-two multiplier circuit 34, one or both of the original multiplications or modified multiplications must be either a pure power-of-two or the sum of two numbers that are consecutive powers-of-two according to the formulas:

$$2^N \tag{3}$$

$$\text{or } 2^N + 2^{N+1} \tag{4}$$

where N is an integer. Multiplicands of this type will be termed "limited-shift resolvable" multiplicands.

The pre-processor circuit 36 includes a selector 37 controlling a demultiplexer 38 to steer the multiplication values to either the standard floating-point multiplier circuit 30 or the power-of-two multiplier circuit 34 depending on the results of its preprocessing. The multiplications are then processed by one of the standard floating-point multiplier circuit 30 or power-of-two multiplier circuit 34 depending on that steering, and the output product 41 of the selected standard floating-point multiplier 30 or power-of-two multiplier circuit 34 is communicated to the output product 41 of the hardware multiplier circuit 28 by multiplexer 38', the latter also controlled by the selector 37.

Generally, the power-of-two multiplier circuit 34 will not include a significand multiplier 32 and will be implemented as combinatorial logic to produce a product 41 in a single clock cycle. In contrast the standard floating-point multiplier circuit 30 will include a significand multiplier 32 and will typically take multiple clock cycles to produce a product 41.

For this reason, a clock signal 40 used to drive the synchronous circuitry of the processor cores 20 may be divided by a clock divider 42 to provide a clock rate signal to the power-of-two multiplier circuit 34 that is reduced in comparison to the clock signal received by the standard floating-point multiplier circuit 30.

When the pre-processor circuit 36 directs the multiplications to the power-of-two multiplier circuit 34, it may shut down power to the standard floating-point multiplier circuit 30 to reduce energy usage. Conversely, although less importantly, the power-of-two multiplier circuit 34 may be shut down when the floating-point multiplier circuit 30 is in use for multiplying the multiplicands.

Referring now to FIG. 2, when the power-of-two multiplier circuit 34 is active, it may receive two multiplicands A and B and one addend C and provide a multiply/accumulate operation or simply a multiply operation (when addend C is zero) or simply an add operation (when A is 1). In the multiply examples, input A of the power-of-two multiplier circuit 34 will always receive a limited-shift resolvable multiplicand as enforced by selection of the pre-processor circuit 36, although both multiplicand A and B may be limited-shift resolvable.

The exponential part of each multiplication is sent to an exponent analyzer circuit 50 and the sum of the exponents A' and B' (of multiplicands A and B) is compared to the exponent C' of the addend C. The significand C" of addend C is then shifted by up to four bits left or right by shifter 52 so that it may be properly aligned to add to the significands A" and B" of multiplicands A and B according to the comparison of the exponents A', B' and C' as is generally understood in the art.

When multiplicand A is a pure power-of-two ($2^N$), it's significand A" will be zero (represented as the form 1.00 . . . 0 where the 1 to the left of the decimal point is the implied 1 of the floating-point significand the digits to the right of the decimal point are the actual stored significand). In this case, the multiplication can be handled exclusively by the exponent analyzer circuit summing the exponents. When multiplicand A is the sum of two consecutive powers of two, the significand A" will be represented as the form 1.10 . . . 0. Here the multiplication involves an interaction among a bit detector 53, a multiplexer 54, and a shifter 55.

Generally, the presence or absence of a bit to the right of the decimal point in the significand A" is detected at bit detector 53 and used to control the multiplexer 54 so that the multiplexer 54 outputs the value of zero at output 56 if A" has no bit to the right of the decimal point and otherwise outputs the value from the shifter 55 receiving significand B". The shifter 55 right shifts the value of B" shifted by one.

An adder 58 may then add the shifted value of significand C", significand B" and the output of multiplexer 54.

The result of this sum is provided to a normalizer 60 which shifts the sum to "left justify" it (typically by a right-shifting) according to the normal convention of a floating-point significand which is output as significand 66. The amount of shifting is communicated to an exponent adjuster 62 to adjust the ultimately output exponent 64 from the exponent analyzer circuit 50 which takes the sum of the exponents B' and A' together with the adjustment from the normalizer 60 to produce an output product exponent 64.

As an example, the process of multiplying a value B by A when A is a pure power-of-two will always present a significand A" of the form 1.000 . . . 0 (that is, having a value of one) which requires no multiplication of the significand B". The multiplication of the entire floating-point number is handled completely at the exponent level with exponents A' and B'.

The process of multiplying a value B by A when A is the sum of two powers of two may be understood through a simple example. Assume that the value of A is 0.75 which may be represented as two consecutive powers of two as follows: $2^{-1}+2^{-2}$. In this case the significand A" will be 1.100 . . . 0 causing the shifter 55 to right shift the significand B" by one and sum it to the un-shifted significand B". The result of this sum provided by adder 58 is:

$$((B''>>1)+B'')>>1 \qquad (5)$$

where >>1 denotes a right shifting operation by one place. The first right shifting is performed by shifter 55 and the second right shifting implicitly performed by the change in the exponent of A'.

It will be appreciated that equation (5) is equivalent to $$0.5*(B''*0.5+B'')$$

or $$0.75*B''$$

Referring now to FIGS. 1 and 3, the pre-processor circuit 36 may readily detect whether either of the multiplications is limited-shift resolvable, that is, a pure power-of-two or the sum of two consecutive powers of two, by observing the pattern of bits in the significand A" or B" which will be of the pattern 1.00 . . . 0 or 1.10 . . . 0, that is, having either a single leftmost implied bit or both a leftmost implied bit and one bit to the right of the decimal point. If there is at least one limited-shift resolvable multiplicand, both multiplicands are forwarded to the power-of-two multiplier circuit 34 as described above and the limited-shift resolvable multiplication is designated A.

The pre-processor circuit 36 may further greatly increase the multiplicands that can be processed by the power-of-two multiplier circuit 34 by modifying at least one of the multiplicands to equal a limited-shift resolvable multiplicand when the error (being the difference between the actual multiplicand and the modified multiplicand) would not exceed a predetermined limit.

For this purpose the pre-processor circuit 36 includes an approximator 39 that may process received multiplicands before they are directed to one of either the floating-point multiplier circuit 30 or power-of-two multiplier circuit 34. The operation of the approximator 39 may begin as indicated by process block 70 of FIG. 3 with the receipt of multiplicands A and B. At decision block 72 a determination is made as to whether either of the multiplicands is limited-shift resolvable and, if so, the multiplicands (and any addend) are forwarded to the power-of-two multiplier as indicated by process block 74 and a product output as indicated by process block 76. If only one multiplicand is limited-shift resolvable, that multiplicand is designated as multiplicand A as discussed above.

If at decision block 72 neither of the multiplicands is limited-shift resolvable, the multiplicands are evaluated to see if they can be approximated by limited-shift resolvable multiplicands within a predetermined error tolerance. At process block 78, flanking limited-shift resolvable multiplicands are determined being the closest limited-shift resolvable multiplicands on either side of the actual multiplicands. Generally if a closest flanking limited-shift resolvable multiplicand is within a predetermined error tolerance of either of the actual multiplicand (as determined at process block 84), the particular flanking limited-shift resolvable multiplicand is substituted for the actual multiplicand for multiplication at process block 80, otherwise the multiplicand (and any addend) are sent to the floating-point multiplier circuit 30 as indicated by process block 82.

Determining whether a particular multiplicand is within a predetermined error tolerance of either of the flanking limited-shift resolvable multiplicands can be performed by simple bit operations readily accomplished by hardware.

For example consider an actual multiplicand of 0.0232. This multiplicand is not a limited-shift resolvable value being neither a pure power-of-two nor the sum of two consecutive powers of two. The significand of 0.0232, in binary is:

(1)011 1110 0000 1101 1110 1101 where (1) is the implied bit, and clearly does not fit into the pattern of a limited-shift resolvable multiplicand having a no more than a single leftmost non-implied bit (the latter shown in parentheses). The sign bit and exponent of this multiplicand will be adopted by any approximation and hence the approximation process concentrates on the significand of 0.0232. Detection of special numbers (zero, NAN and plus or minus infinity) are provided at this stage which are not identified as shift resolvable and cause the forwarding of the multiplicand to the standard floating-point multiplier circuit 30 of process block 82.

In the first part of this process, the closest shift resolvable multiplicand to 0.0232 may be determined providing a choice between flanking limited-shift resolvable values of significand 0.0234375 decoding in binary to:

(1)100 0000 0000 0000 0000 0000 exhibiting the single leftmost non-implied bit (in the form of 1.100 . . . 0) and significand 0.015625 decoding in binary to:

(1)000 0000 0000 0000 0000 0000 exhibiting no more than a single leftmost non-implied bit (in the form of 1.00 . . . 0).

The closest of these flanking power-of-two values may be determined simply by a rounding process of the significand of 0.0232 to 2 places. This can be done rapidly by inspecting bits 22 and 21 of the significand. The high-value approximation is selected if either bit 22 or bit 21 is one. Otherwise the low value significant is selected.

In this example, for multiplicand 0.0232, both bits 22 and 23 are one (implied bit (1) is bit 24) and accordingly the high-value approximation is selected being a significand of 0.0234375 decoding in binary to:

(1)100 0000 0000 0000 0000 0000.

The error resulting from this approximation is then determined being the difference between the original multiplicand value and its approximation by the above technique. This difference can be readily determined by the residual value of bits 0-21 of the multiplicand when the approximation is downward and by the two's complement of bits 0-21 approximated by the bitwise inverse of these bits when the approximation is upward (occurring only when bit 22 is zero and bit 21 is one). This error value may be evaluated against a desired tolerance by comparing the error to a mask and performing a bitwise AND. Only if the error is within tolerance (as determined by decision block 86) will the approximation be performed and the modified multiplicand sent to the power-of-two multiplier circuit 34 of process block 74; otherwise, the floating-point multiplier circuit 30 will be used for the multiplication per process block 82.

The pre-processor circuit 36 in selecting between the floating-point multiplier circuit 30 and the power-of-two multiplier circuit 34 may also control power to these devices reducing power to the floating-point multiplier circuit 30 when the power-of-two multiplier circuit 34 will be used, either by reducing its clocking speed or operating voltage, or a combination of other known techniques.

It will be appreciated that the present invention can be expanded the to situations where one or both of the multiplicands is the sum of three or more consecutive or non-consecutive powers of two (e.g. $2^N$ and $2^{N+2}$) simply by using more shift and adding stages, in much the manner of a conventional floating-point processor. It is believed that limiting this expansion to multiplicands being representable by more than two consecutive powers of two provides a valuable trade-off between being able to handle a significant number of multiplication operations (especially with approximations) for important applications such as pixel arithmetic and saving power. Nevertheless, the invention is not limited to only multiplicands that may be represented by a sum of two consecutive powers of two, but can generally be implemented with any multiplier that provides a power advantage over a standard floating-point multiplier for a limited set of multiplicands and their approximations.

While a cell phone has been described, it will be recognized that a similar structure is used in many portable electronic devices including tablet and laptop computers and this description is intended to provide useful background rather than to be limiting. It will also be appreciated that these functional blocks of the present invention will generally be provided on the single integrated circuit but may be allocated among different or single integrated circuits and are presented as discrete functional blocks for clarity of description. In general, these functions may be freely allocated between dedicated hardware, hardware and firmware, and software.

The invention does not require modification of the program or program compilers, instead operating in real time in the processor hardware. Nevertheless it will be appreciated that elements of the present invention may be implemented at compilation, for example, by allowing the programmer to designate particular operations to be performed by the power-of-two multiplier circuit and/or setting the error tolerance mask (including setting it to values that effectively allow arbitrarily large error tolerances). In this case, the instruction decoder of the computer provides information to this pre-processor circuit through special compiled instructions.

While the present invention is contemplated as a way of saving electrical energy, it will be appreciated that it can also provide higher speed multiplication if desired. Clearly the present invention is not limited to any particular floating-point standard or the single precision floating-point IEEE 754 standard used in the above examples.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A multiplier circuit system for multiplying floating-point numbers expressed as exponents and significands in an electronic computer comprising:

a floating-point multiplier circuit receiving floating-point multiplicands having a first significand length and outputting a floating-point product of the floating-point multiplicands;

a power-of-two multiplier circuit receiving at least one constrained floating-point multiplicand having a second significand length less than the first significand length and outputting a floating-point product only for a product including at least one constrained floating-point multiplicand; and a selector circuit directing floating-point multiplicands including at least one constrained floating-point multiplicand to the power-of-two multiplier circuit and directing a floating-point multiplicand not including at least one constrained floating-point multiplicand to the floating-point multiplier circuit and outputting a floating-point from a corresponding one of the power-of-two multiplier circuit and floating-point multiplier circuit;

wherein the selector circuit receives floating-point multiplicands and modifies at least some floating-point multiplicands to be constrained floating-point multiplicands when the modification changes the value of the received floating-point multiplicands by less than a predetermined error value and directs the modified floating-point multiplicands to the power-of-two multiplier circuit as constrained floating-point multiplicands.

2. The multiplier circuit system of claim 1 wherein the constrained floating-point multiplicand must have a significand less than or equal to half a length of the floating-point multiplier significand.

3. The multiplier circuit system of claim 2 wherein the constrained floating-point multiplicand is only a number equal to an integer power-of-two or a sum of numbers each equal to a consecutive integer power-of-two.

4. The multiplier circuit system of claim 3 wherein the constrained floating-point multiplicand is only a number equal to an integer power-of-two or a sum of only two numbers each equal to a consecutive integer power-of-two.

5. The multiplier circuit system of claim 1 wherein the modification rounds the received multiplicand to a precision of the second significand length.

6. The multiplier circuit system of claim 5 wherein the rounding selects between rounding up and rounding down to reduce an amount of change to the received floating-point multiplicand in the modification.

7. The multiplier circuit system of claim 1 wherein the floating-point multiplicands include an exponent portion and a significand portion and wherein the floating-point multiplier includes a significand multiplier and the power-of-two multiplier circuit does not include a significand multiplier.

8. The multiplier circuit system of claim 1 wherein each of the floating-point multiplier and power-of-two multiplier accepts three inputs including two multiplicands and one addend and operates to multiply the two multiplicands and sums a resulting product with the addend.

9. The multiplier circuit system of claim 1 wherein each of the floating-point multiplier and power-of-two multiplier are synchronous circuits receiving a clock signal and wherein the power-of-two multiplier receives a slower clock signal than the floating-point multiplier.

10. The multiplier circuit system of claim 9 wherein each of the floating-point multiplier and power-of-two multiplier provide for multiplications of the multiplicands with substantially identical processing time.

11. The multiplier circuit system of claim 1 wherein the selector circuit further reduces power to the floating-point multiplier circuit when the multiplications are directed to the power-of-two multiplier circuit.

12. A graphic processor unit providing multiple graphic processing cores each incorporating the multiplier circuit system of claim 1.

13. A portable electronic device providing an electronic computer having a processor for executing a stored program as powered by a battery wherein the electronic processor provides the multiplier circuit system of claim 1.

14. A multiplier circuit system for multiplying floating-point numbers expressed as exponents and significands in an electronic computer comprising:

a floating-point multiplier circuit receiving floating-point multiplicands having a first significand length and outputting a floating-point product of the floating-point multiplicands:

a power-of-two multiplier circuit receiving at least one constrained floating-point multiplicand having a second significand length less than the first significand length and outputting a floating-point product only for a product including at least one constrained floating-point multiplicand; and a selector circuit directing floating-point multiplicands including at least one constrained floating-point multiplicand to the power-of-two multiplier circuit and directing a floating-point multiplicand not including at least one constrained floating-point multiplicand to the floating-point multiplier circuit and outputting a floating-point from a corresponding one of the power-of-two multiplier circuit and floating-point multiplier circuit;

wherein the power-of-two multiplier circuit further includes a significand shifter shifting one multiplicand if the multiplicand is a sum of two numbers equal to powers-of-two.

15. The multiplier circuit system of claim 14 wherein the shift is one position to the right when the multiplicand is the sum of two numbers equal to consecutive powers-of-two.

16. A method of multiplying digital values employing a multiplier circuit system for an electronic computer having:

a floating-point multiplier circuit receiving floating-point multiplicands and outputting a floating-point product of the floating-point multiplicands;

a power-of-two multiplier circuit receiving constrained floating-point multiplicands and outputting a floating-point product of the constrained floating-point multiplicands when the constrained floating-point multiplicands include at least one multiplicand limited to a number equal to an integer power-of-two or a sum of two numbers each equal to an integer power-of-two; and a selector circuit directing floating-point multiplicands received by the multiplier circuit system to one of the floating-point multiplier circuit and power-of-two multiplier circuit and directing a corresponding one of the floating-point products of the floating-point multiplier circuit and power-of-two multiplier circuit to an output from the multiplier circuit system, the method comprising the steps of:

(a) evaluating by the multiplier circuit the multiplicands to determine when at least one multiplicand is a number equal to an integer power-of-two or a sum of two numbers each equal to an integer power-of-two;

(b) when at least one multiplicand is a number equal to an integer power-of-two or a sum of two numbers each equal to an integer power-of-two, causing the selector circuit to direct both multiplications to the power-of-two multiplier; and (c) multiplying multiplicands directed to the power-of-two multiplier by the power-of-two multiplier;

further including the step of causing the selector circuit to direct both multiplicands to the power-of-two multiplier when at least one multiplicand may be approximated by a number equal to an integer power-of-two or a sum of two numbers each equal to an integer power-of-two to within a predetermined error magnitude.

17. The method of claim 16 wherein the multiplicands are expressed as floating-point numbers using exponents and significands and step (c) does not multiply the significands.

18. The method of claim 16 including the step of reducing power to the floating-point multiplier at step (c).

* * * * *